(12) United States Patent
Sugahara et al.

(10) Patent No.: US 9,754,740 B2
(45) Date of Patent: Sep. 5, 2017

(54) SWITCHING CONTROL CIRCUIT AND SWITCHING POWER-SUPPLY DEVICE

(71) Applicant: SANKEN ELECTRIC CO., LTD., Niiza-shi, Saitama (JP)

(72) Inventors: Takeki Sugahara, Niiza (JP); Osamu Ohtake, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 0 days.

(21) Appl. No.: 14/953,023

(22) Filed: Nov. 27, 2015

(65) Prior Publication Data

US 2017/0154739 A1    Jun. 1, 2017

(51) Int. Cl.
*H01H 9/54* (2006.01)
*H02M 3/335* (2006.01)
*H02M 1/42* (2007.01)

(52) U.S. Cl.
CPC ............ *H01H 9/54* (2013.01); *H02M 1/4208* (2013.01); *H02M 1/4241* (2013.01); *H02M 3/33507* (2013.01)

(58) Field of Classification Search
CPC ............... H02M 3/28; H02M 3/33507; H02M 3/33523; H02M 3/33592; H02M 3/3372; H02M 3/3378; H02M 3/3381; H02M 3/3385; H02M 7/445; H02M 7/517; H02M 1/4208; H02M 1/4241; H02M 2001/0032; Y02B 70/126; Y02B 70/1433; Y02B 70/1475; H01H 9/54
USPC ........... 363/15, 16, 21.01–21.18, 24, 49, 89, 363/97–98, 120, 127
See application file for complete search history.

(56) References Cited

U.S. PATENT DOCUMENTS

| | | | | |
|---|---|---|---|---|
| 7,535,736 B2* | 5/2009 | Nakamura | ............... | H02M 1/32 363/21.15 |
| 8,416,596 B2* | 4/2013 | Huang | ............... | H02M 3/33507 363/21.11 |
| 9,036,369 B2* | 5/2015 | Mayell | ............... | H02M 3/33515 363/15 |
| 2006/0209581 A1* | 9/2006 | Choi | ................. | H02M 3/33523 363/120 |

* cited by examiner

*Primary Examiner* — Yemane Mehari
(74) *Attorney, Agent, or Firm* — Banner & Witcoff, Ltd.

(57) ABSTRACT

Disclosed is a switching control circuit for performing an ON-OFF control of a switching element. The switching control circuit includes a first external terminal; a second external terminal; a passive element connected between the first external terminal and the second external terminal; and a function setting circuit, which performs a function setting based on a constant of the passive element. An electric potential at the first external terminal and an electric potential at the second external terminal are controlled.

14 Claims, 5 Drawing Sheets

SWITCHING CONTROL CIRCUIT AND SWITCHING POWER-SUPPLY DEVICE

TECHNICAL FIELD

The present invention relates to a switching control circuit and a switching power-supply device having the switching control circuit.

BACKGROUND ART

A power source in electronic equipment such as TVs, smart phones or personal computers is required to stably supply a constant DC voltage. A switching power-supply device is used as the power source.

A control IC (Integrated Circuit) used in the switching power-supply device performs a function setting, such as a threshold-value setting operation for determining of switching between standby operation and steady operation at the time of start or the like.

U.S. Pat. No. 9,036,369 discloses technique for generating an identification signal in a control IC by a diode and a resistor externally attached to the control IC when the start of the control IC, and then performing the function setting of the control IC.

US2006/209581 discloses technique for performing the function setting of the control IC by generating a voltage to an external terminal of the control IC with using a resistor or the like and then comparing the generated voltage with a reference voltage.

However, in the two technique, since the dedicated resistor or diode for the function setting are required, a miniaturization and a reduction in cost of the switching power-supply device is hindered.

SUMMARY

Accordingly, the present invention is to provide a switching control circuit capable of realizing miniaturization or a reduction in cost of a switching power-supply device and a switching power-supply device having the switching control circuit.

A switching control circuit of this disclosure is a switching control circuit for performing an ON-OFF control of a switching element. The switching control circuit includes a first external terminal, a electric potential on which is controlled; a second external terminal, a electric potential on which is controlled; a passive element, which is connected between the first external terminal and the second external terminal; and a function setting circuit, which performs a function setting based on a constant of the passive element.

A switching power-supply device of this disclosure is a switching power-supply device for generating a second voltage from a first voltage by a switching operation of a switching element, the switching power-supply device includes a above-described switching control circuit; and a switching element, which is ON-OFF controlled by the switching control circuit.

According to the present invention, it is possible to provide a switching control circuit capable of realizing miniaturization and a reduction in cost of a switching power-supply device and a switching power-supply device having the switching control circuit.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, embodiments will be described with reference to the accompanying drawings.

First Embodiment

Figure 1:
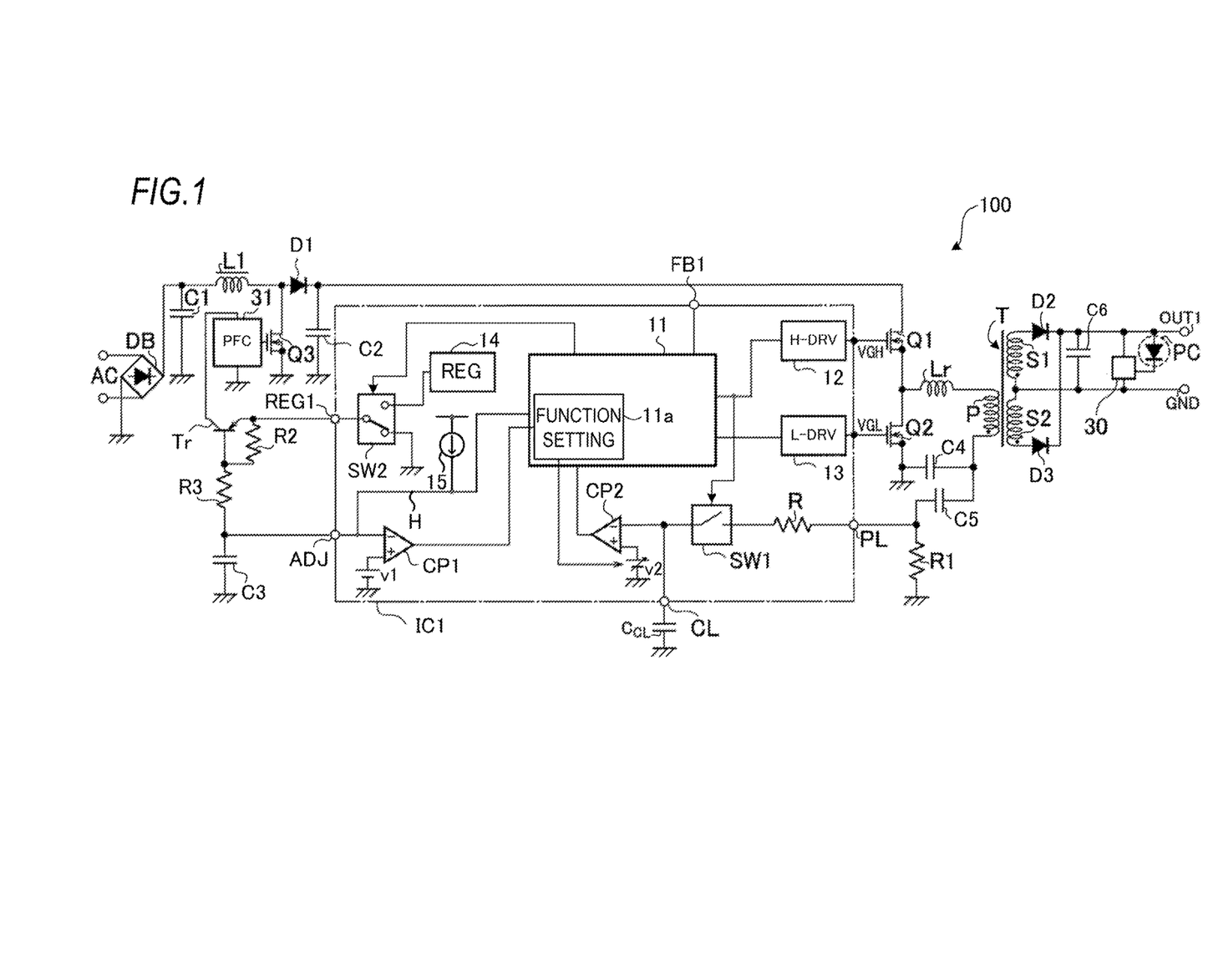
FIG. 1 is a view illustrating a schematic configuration of a current-resonance-type switching power-supply device according to a first embodiment of the present invention.

FIG. 1 is a view illustrating a schematic configuration of a current-resonance-type switching power-supply device according to a first embodiment of the present invention.

The switching power-supply device 100 illustrated in FIG. 1 includes a full-wave rectifier circuit DB, capacitors C1 to C6, inductors L1 and Lr, a PFC (Power Factor Correction) controller 31, switching elements Q1 to Q3, a transformer T having a primary coil P and secondary coils S1 and S2, diodes D1 to D3, a transistor Tr, resistor R1 to R3, a photo coupler PC, an output voltage detector 30, a capacitor $C_{CL}$, and a switching control circuit IC1.

The full-wave rectifier circuit DB performs the full-wave rectification of an AC voltage AC and outputs a full-wave rectified voltage.

One end of the inductor L1 is connected to an output terminal of the full-wave rectifier circuit DB. An anode of the diode D1 is connected to the other end of the inductor L1. A series circuit of the switching elements Q1 and Q2 is connected between a cathode of the diode D1 and a ground.

For the switching elements Q1 and Q2, a switch operable element such as a MOSFET is used. In an example of FIG. 1, each of the switching elements Q1 and Q2 is composed of the MOSFET.

One end of the capacitor C1 is connected to a connecting point between the full-wave rectifier circuit DB and the inductor L1. The other end of the capacitor C1 is connected to the ground.

A drain of the switching element Q3 being the MOSFET is connected to a connecting point between the inductor L1 and the anode of the diode D1. A source of the switching element Q3 is connected to the ground.

The PFC controller 31 improves a power factor by switching on-and-off the switching element Q3. A collector of the transistor Tr is connected to the PFC controller 31. The PFC controller 31 is operated by a voltage supplied from the switching control circuit IC1 via the transistor Tr.

An external terminal REG1 of the switching control circuit IC1 is connected to an emitter of the transistor Tr. One end of the resistor R3 is connected to a base of the transistor Tr. The capacitor C3 is connected between the other end of the resistor R3 and the ground. The external terminal REG1 constitutes the first external terminal.

A resistor R2 is connected between the emitter of the transistor Tr and a connecting point between the base of the transistor Tr and one end of the resistor R3. The resistances R2 and R3 constitute a passive element.

An external terminal ADJ of the switching control circuit IC1 is connected to a connecting point between the other end of the resistor R3 and the condenser C3. The external terminal ADJ constitutes a second external terminal.

A series circuit of the current resonance inductor Lr, the primary coil P of the transformer T and the current resonance capacitor C4 is connected between the drain and the source of the switching element Q2.

One end of the capacitor C5 is connected to a connecting point between the primary coil P and the capacitor C4. One end of the resistor R1 is connected to the other end of the capacitor C5. The other end of the resistor R1 is connected to the ground. An external terminal PL of the switching control circuit IC1 is connected to the connecting point between the capacitor C5 and the resistor R1.

The secondary coils S1 and S2 of the transformer T are connected in series, and an anode of the diode D2 is connected to one end of the secondary coil S1. An anode of the diode D3 is connected to one end of the secondary coil S2.

A cathode of the diode D2 and a cathode of the diode D3 are connected to one end of the capacitor C6, an anode of a photodiode constituting a photocoupler PC and one end of the output voltage detector 30. The other end of the capacitor C6 and the other end of the output voltage detector 30 are connected to a connecting point between the secondary coils S1 and S2.

Each of the cathodes of the diodes D2 and D3 is connected to the output terminal OUT1. The connecting point between the secondary coils S1 and S2 is connected to the ground terminal GND.

The output voltage detector 30 detects output voltage generated on both ends of the capacitor C6, and outputs the detected voltage as a feedback signal through the photocoupler PC to an external terminal FB1 of the switching control circuit IC1 on a primary side.

The switching elements Q1 and Q2 are alternately switched on-and-off in response to a signal supplied from the switching control circuit IC1.

The switching control circuit IC1 alternately switches on-and-off the switching elements Q1 and Q2 such that the output voltage becomes a desired value based on the feedback signal input to the external terminal FB1.

The switching control circuit IC1 is composed of an IC(integrated circuit), and includes a drive controller 11, a high side driver 12, a low side driver 13, a regulator circuit 14, a constant current source 15 constituting a current supply circuit, switches SW1 and SW2, comparators CP1 and CP2, and a resistor R.

The high side driver 12 outputs a high side drive signal VGH to a gate of the switching element Q1 in response to a drive signal supplied from the drive controller 11, and drives the switching element Q1.

The low side driver 13 outputs a low side drive signal VGL to a gate of the switching element Q2 in response to a drive signal supplied from the drive controller 11, and drives the switching element Q2.

The drive controller 11 accommodates an oscillator (not shown) and the like, generates a drive signal for switching on-and-off the switching elements Q1 and Q2 based on a signal generated from the oscillator and the feedback signal input into the external terminal FB1, and outputs the drive signal to the high side driver 12 and the low side driver 13.

The regulator circuit 14 generates a PFC voltage to operate the PFC controller 31, based on the input voltage input into the switching control circuit IC1.

The switch SW2 has one common contact point and two contact points. One of the two contact points of the switch SW2 is connected to the regulator circuit 14, and the other of the two contact points of the switch SW2 is connected to the ground. The common contact point of the switch SW2 is connected to the external terminal REG1. The switch SW2 is controlled by the drive controller 11.

The external terminal ADJ is connected to an inversion input terminal of the comparator CP1. A predetermined threshold voltage v1 is input into a non-inversion input terminal of the comparator CP1. An output signal of the comparator CP1 is input into the function setting circuit 11a in the drive controller 11.

One end of a switch (not shown) in the drive controller 11 is connected to a connecting point between the inversion input terminal of the comparator CP1 and the external terminal ADJ. A predetermined current flows from the constant current source 15 to a wiring H connecting one end of the switch with the connecting point.

The other end of the switch in the drive controller 11 is connected to the ground. Thus, if the switch is in on-state, the electric potential of the external terminal ADJ becomes a ground level. If the switch is in off-state, the current of the constant current source 15 is output from the external terminal ADJ.

One end of the switch SW1 is connected to an inversion input terminal of the comparator CP2. A variable threshold voltage v2 is input into a non-inversion input terminal of the comparator CP2. The threshold voltage v2 is set by the function setting circuit 11a in the drive controller 11.

One end of the resistor R is connected to the other end of the switch SW1. The switch SW1 is turned on when the drive signal input into the high side driver 12 is a high level, and is turned off when the drive signal is a low level. The other end of the resistor R is connected to the external terminal PL.

In a period when the drive signal supplied to the high side driver 12 is the high level and the switching element Q1 is in on-state, the switch SW1 is turned on. At this time, a resonance current flows in the primary coil P of the transformer T. This resonance current is extracted by the capacitor C5 and is input through the switch SW1 into the external terminal CL, so that an internal input current of the external terminal CL is obtained. The internal input current of the external terminal CL includes a load current and a circulation current.

When the internal input current of the external terminal CL is taken in for a period when the switching element Q1 is in on-state, the load current is integrated by the capacitor $C_{CL}$ connected to the external terminal CL for the above-mentioned ON period. Since the voltage of the capacitor $C_{CL}$ integrated in this manner reflects information on the load current, heavy load becomes higher than light load.

The comparator CP2 compares a voltage between the both ends of the capacitor $C_{CL}$ input into the inversion input terminal with the threshold voltage v2, detects a steady state when the both-end voltage of the capacitor $C_{CL}$ is equal to or greater than the threshold voltage v2, and outputs a low level of signal to the drive controller 11. On the other, when the voltage between the both ends of the capacitor $C_{CL}$ is less than the threshold voltage v2, the comparator CP2 detects a standby state and outputs a high level of signal (standby detection signal) to the drive controller 11.

When the output signal of the comparator CP2 is the low level (steady state), the drive controller 11 performs a normal control in which the control of alternately turning on-and-off the switching elements Q1 and Q2 is continuously performed.

Meanwhile, when the output signal of the comparator CP2 is the high level (standby state), the drive controller 11 performs a burst oscillation control in which the control of alternately turning on-and-off the switching elements Q1 and Q2 is intermittently performed. As described above, the drive controller 11 performs switching between the function of performing the normal control and the function of performing the burst oscillation control, based on the output signal of the comparator CP2.

The threshold voltage v2 is reference voltage for determining conditions of switching two functions, namely, the function of performing the normal control and the function of performing the burst oscillation control. The switching conditions for the two functions is changed depending on the magnitude of the threshold voltage v2, it is possible to switch the functions under a condition depending on a load circuit connected to the switching power-supply device 100. Therefore, the setting of the threshold voltage v2 means that the setting of the function of the switching control circuit IC1.

Hereinafter, an operation of the switching power-supply device 100 including the method of setting the threshold voltage v2 will be described.

Figure 2:
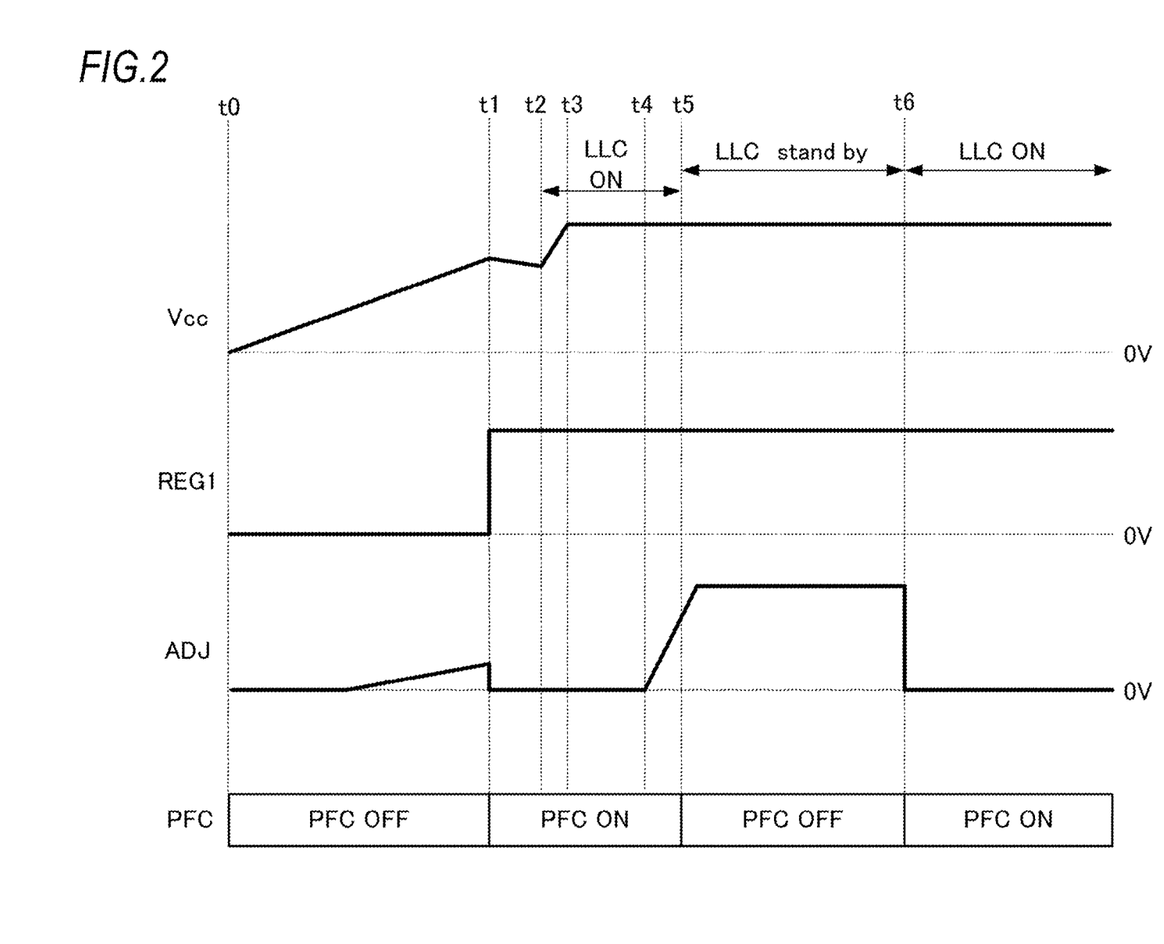
FIG. 2 is a timing chart illustrating an operation of the switching power-supply device 100 of FIG. 1.

FIG. 2 is a timing chart illustrating the operation of the switching power-supply device 100 of FIG. 1.

The term "Vcc" of FIG. 2 denotes a power supply voltage input from an AC power supply through the full-wave rectifier circuit DB to the switching control circuit IC1. The term "REG1" denotes an electric potential of the external terminal REG1. The term "ADJ" denotes an electric potential of the external terminal ADJ. The term "PFC" denotes an operational state of the PFC controller 31.

The switching power-supply device 100 is connected to a commercial power source, and the switching control circuit IC1 starts at time t0. The function setting circuit 11a connects a movable end of the switch SW2 to the ground at time t0, and controls the electric potential of the external terminal REG1 to the ground level.

In this state, the transistor Tr is turned off, and the PFC controller 31 is stopped. The function setting circuit 11a turns off the switch accommodated in the drive controller 11 after the switching control circuit IC1 has been started. As a result, an electric current is supplied from the constant current source 15 to the external terminal ADJ, and the electric potential of the external terminal ADJ starts to rise after a short time has passed from time t0.

When the electric potential of the external terminal ADJ reaches the threshold voltage v1 at time t1, the high level of signal is changed to a low level of signal and the low level of signal is output from the comparator CP1. The function setting circuit 11a reads the voltage depending on the output signal of the comparator CP1 from an internal memory, and is set as the threshold voltage v2. The set threshold voltage v2 is retained until the power supply of the switching control circuit IC1 becomes off-state.

In this way, the function setting circuit 11a sets the threshold voltage v2 based on the constant of the resistors R2 and R3 that are the passive element connected between the external terminal REG1 that is the first external terminal and the external terminal ADJ that is the second external terminal.

After the threshold voltage v2 is set at time t1, the function setting circuit 11a causes the movable end of the switch SW2 to connect with the regulator circuit 14 and the external terminal REG1 to output the PFC voltage. Further, the function setting circuit 11a turns on the switch in the drive controller 11 and controls the electric potential of the external terminal ADJ to the ground level.

As a result, the transistor Tr is turned on, the PFC voltage output from the external terminal REG1 is input into the PFC controller 31, and an operation of improving the power factor is started by the PFC controller 31 (PFC ON).

At time t2 after time t1, the control operation for alternately turning on-and-off the switching elements Q1 and Q2 is started (LLC ON).

At time t4 after time t2, when the output signal of the comparator CP2 becomes the high level, the switch in the drive controller 11 is turned off. As a result, an electric current is supplied from the constant current source 15 to the external terminal ADJ, and the electric potential of the external terminal ADJ starts to rise. And then, at time t5, the transistor Tr is turned off and the improving operation of the power factor by the PFC controller 31 is stopped (PFC OFF).

At time t5, the drive controller 11 starts the burst oscillation control, and the switching power-supply device 100 shifts to the standby state.

At time t6 after time t5, when the output signal of the comparator CP2 becomes the low level, the switch in the drive controller 11 is turned on, and the drive controller starts the normal control. The switch is turned on, so that the transistor Tr is turned on and the operation of improving the power factor using the PFC controller 31 is started (PFC ON).

Subsequently, the above-described operations are repeated depending on the output level of the comparator CP2.

As described above, the switching control circuit IC1 uses the external terminals REG1 and ADJ not only for improving the power factor but also as a terminal for setting the threshold voltage v2. Further, the switching control circuit IC1 sets the threshold voltage v2 using the resistors R2 and R3 that are the passive element for improving the power factor. Therefore, it is possible to achieve the miniaturization and the reduction in cost of the switching power-supply device 100 without the necessity of installing the dedicated element for setting the threshold voltage v2 in the switching power-supply device 100. Additionally, if the comparator CP1 is replaced with an multi-comparator, which uses plural values different from the threshold value v1 inputted to the non-inversion terminal, it is possible to finely set the threshold value v2 based on the signal from comparator CP1.

Second Embodiment

Figure 3:
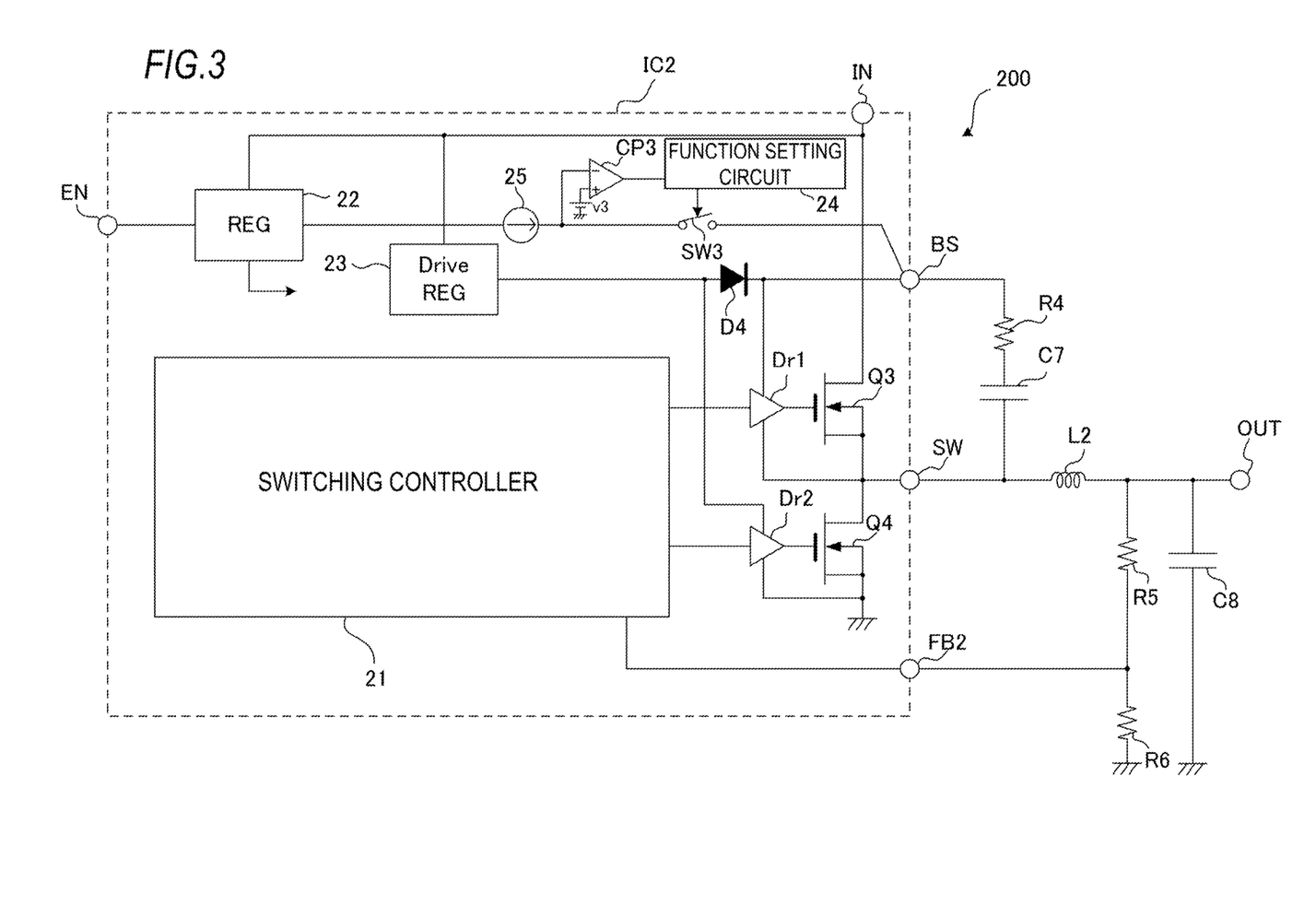
FIG. 3 is a view illustrating a schematic configuration of a DC/DC converter 200 of a switching power-supply device according to a second embodiment of the present invention.

FIG. 3 is a view illustrating a schematic configuration of a DC/DC converter 200 of a switching power-supply device according to the second embodiment of the present invention.

The DC/DC converter 200 includes a switching control circuit IC2 constituted by an integrated circuit, resistors R4 to R6, a bootstrap capacitor C7, a capacitor C8, and an inductor L2.

One end of the resistor R4 is connected to an external terminal BS of the switching control circuit IC2. The other end of the resistor R4 is connected to one end of the bootstrap capacitor C7. The other end of the bootstrap capacitor C7 is connected to an external terminal SW of the switching control circuit IC2.

The external terminal SW constitutes a first external terminal. The external terminal BS constitutes a second external terminal. The bootstrap capacitor C7 constitutes a passive element.

One end of the inductor L2 is connected to a connecting point between the external terminal SW of the switching control circuit IC2 and the other end of the bootstrap capacitor C7. The other end of the inductor L2 is connected to an output terminal OUT.

One end of the capacitor C8 is connected to a connecting point between the inductor L2 and the output terminal OUT. The other end of the capacitor C8 is connected to the ground.

One end of a series circuit of the resistors R5 and R6 is connected to a connecting point between the inductor L2 and the output terminal OUT. The other end of the series circuit is connected to the ground. An external terminal FB2 of the switching control circuit IC2 is connected to a connecting point between the resistors R5 and R6 in this series circuit.

The resistors R5 and R6 are voltage detection resistor for detecting the voltage of the capacitor C8. A feedback signal depending on the output voltage of the DC/DC converter 200 is input into the external terminal FB2.

The switching control circuit IC2 includes a switching controller 21, a regulator circuit 22, a drive regulator circuit 23, a diode D4, a function setting circuit 24, a constant current source 25 as a current supply circuit, a switch SW3, a comparator CP3, switching elements Q3 and Q4, and drive circuits Dr1 and Dr2.

Each of the switching elements Q3 and Q4 is constituted by a MOSFET.

A drain of the switching element Q3 is connected to an external terminal IN to perform the power input of the switching control circuit IC2. A source of the switching element Q3 is connected to a drain of the switching element Q4. A source of the switching element Q4 is connected to the ground.

A connecting point between the switching elements Q3 and Q4 is connected to the external terminal SW.

The switching controller 21 generates a drive signal for alternately switching on-and-off the switching elements Q3 and Q4 based on a signal of an oscillator installed therein and the feedback signal input from the external terminal FB2.

The drive circuit Dr1 drives the switching element Q3 in response to the drive signal generated by the switching controller 21. A power terminal of the drive circuit Dr1 is connected to a cathode of the diode D4 and the connecting point between the switching elements Q3 and Q4.

The drive circuit Dr2 drives the switching element Q4 in response to the drive signal generated by the switching controller 21. A power terminal of the drive circuit Dr2 is connected to a connecting point between the drive regulator circuit 23 and the diode D4 and the ground.

The drive regulator circuit 23 inputs voltage, which is generated from the input voltage Vin that is input into the external terminal IN, into the diode D4 and the power terminal of the drive circuit Dr2. The cathode of the diode D4 is connected to the external terminal BS.

The drive regulator circuit 23 charges the bootstrap capacitor C7 through the diode D4 when the switching element Q3 is in off-state and the switching element Q4 is in on-state, based on the input voltage Vin input into the external terminal IN, thereby generating the power supply voltage of the drive circuit Dr1, The regulator circuit 22 generates voltage required in the switching control circuit IC2 from the input voltage Vin and supplies the voltage to each part in the switching control circuit IC2. The external terminal EN is connected to the regulator circuit 22 to input an enable signal.

When the high level of signal is input into the external terminal EN, the regulator circuit 22 generates voltage from the input voltage Vin and supplies the voltage to each part. That is, when the enable signal is in the low level, the switching control circuit IC2 becomes a stop state.

The voltage generated in the regulator circuit 22 is also supplied to the constant current source 25. One end of the switch SW3 is connected to the output terminal of the constant current source 25. The other end of the switch SW3 is connected to the external terminal BS.

An inversion input terminal of the comparator CP3 is connected to a connecting point between the constant current source 25 and one end of the switch SW3. A predetermined threshold voltage v3 is input into a non-inversion input terminal of the comparator CP3. An output signal of the comparator CP3 is input into the function setting circuit 24.

The function setting circuit 24 turns on the switch SW3 and supplies an electric current from the constant current source 25 to the resistor R4 and the bootstrap capacitor C7 in a period when the electric potential of the external terminal SW is fixed to the ground level (specifically, a predetermined period after the enable signal input into the external terminal EN becomes the high level and the switching control circuit IC2 returns from the stop state).

This current leads to an increase in voltage of the bootstrap capacitor C7 and an increase in voltage of the external terminal BS. After a predetermined time has elapsed, the comparator CP3 compares the voltage of the external terminal BS with the threshold voltage v3.

Similarly to the function setting circuit 11a of FIG. 1, the function setting circuit 24 performs the function setting of the switching control circuit IC2 in response to the output signal of the comparator CP3. That is, the function setting circuit 24 performs the function setting, based on the constant of the bootstrap capacitor C7 that is the passive element connected between the external terminal SW that is the first external terminal and the external terminal BS that is the second external terminal.

For example, the function setting of the switching control circuit IC2 means the operation of setting a threshold for determining the switching condition between the normal control, in which the switching controller 21 continuously performs the control of alternately turning on-and-off the switching elements Q3 and Q4, and the burst oscillation control, in which the switching controller 21 intermittently performs the control of alternately turning on-and-off the switching elements Q3 and Q4.

An operation of the DC/DC converter 200 configured as above will be described below.

When the enable signal input into the external terminal EN becomes the high level in the state where the input voltage Vin is input into the external terminal IN, the function setting circuit 24 turns on the switch SW3. As a result, a current flows from the constant current source 25 through the external terminal BS to the bootstrap capacitor C7. At this time, the electric potential of the external terminal SW is in the ground level. When the electric potential of the external terminal BS rises and the electric potential reaches the threshold voltage v3, the output of the comparator CP3 becomes the high level.

When the high level of signal is transmitted from the comparator CP3 to the function setting circuit, the function setting circuit 24 performs the function setting of the switching control circuit IC2 in response to this signal. These setting contents are retained until the power supply of the switching control circuit IC2 is in off-state (the state where no input voltage Vin is input).

The function setting circuit 24 turns off the switch SW3 when the function setting is finished. Thereafter, the normal operation which performs the ON-OFF control of the switching elements Q3 and Q4 by the switching controller 21 starts, and the electric potentials of the external terminals BS and SW are changed sequentially.

As described above, in the switching control circuit IC2, the external terminals BS and SW, which are used for generating the output voltage and the power supply voltage of the drive circuit Dr1, are also used as terminals for setting the function. Further, the switching control circuit IC2 performs the function setting with using the bootstrap capacitor C7 that is the passive element for generating the power supply voltage of the drive circuit Dr1. Therefore, it is unnecessary to form the dedicated element for the function setting in the DC/DC converter 200, so that the miniaturization and the reduction in cost of the DC/DC converter 200 are realized.

In the DC/DC converter 200 illustrated in FIG. 3, the resistor R4 may be omitted. Further, the switching elements Q3 and Q4 may be provided outside the switching control circuit IC2.

Third Embodiment

Figure 4:
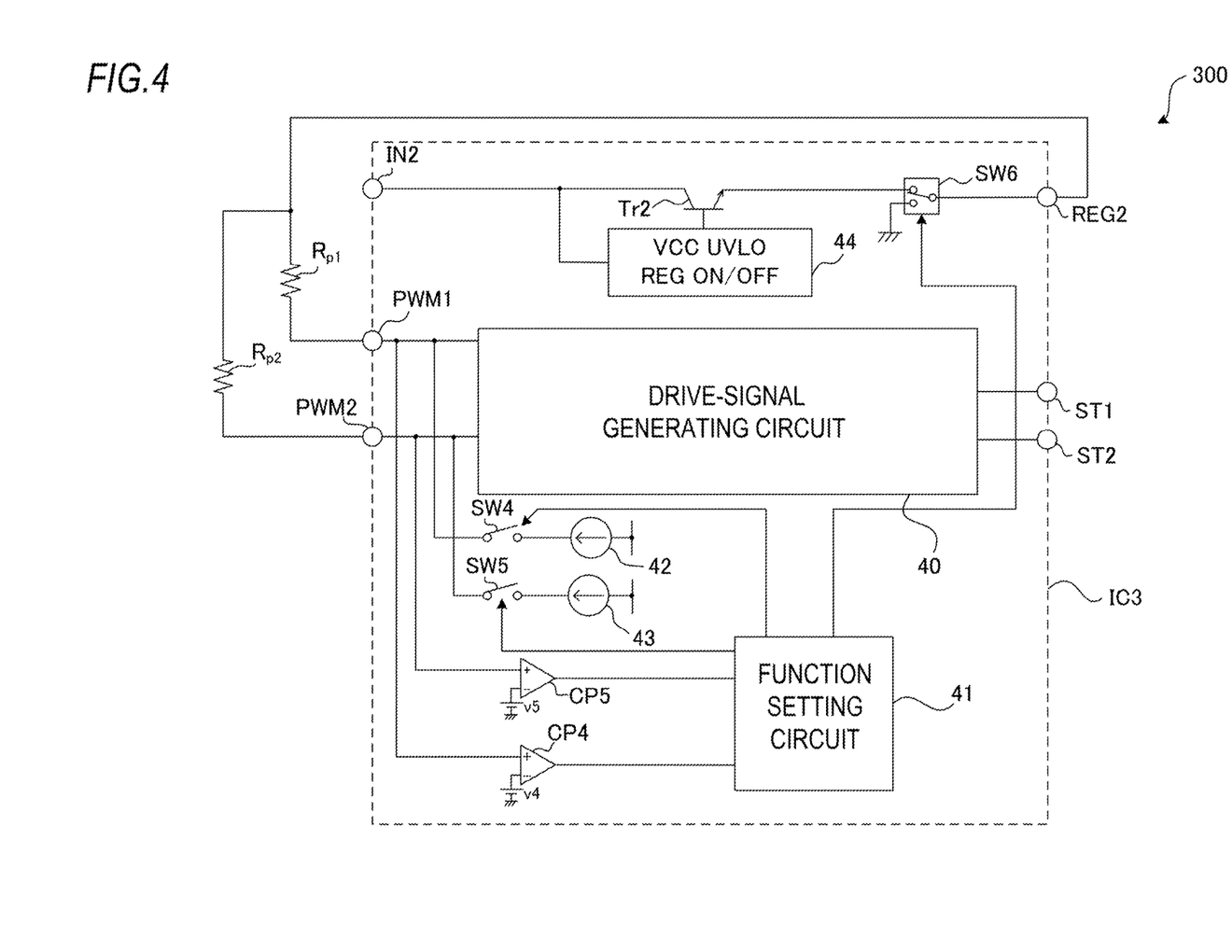
FIG. 4 is a view illustrating a schematic configuration of an LED (Light Emitting Diode) backlight driver 300 using the switching control circuit of the present invention.

FIG. 4 is a view illustrating a schematic configuration of an LED backlight driver 300, in which the switching control circuit of the present invention is applied.

The LED backlight driver 300 includes a switching control circuit IC3 constituted by an integrated circuit, and pull-up resistors $R_{p1}$ and $R_{p2}$.

One end of the pull-up resistor $R_{p1}$ is connected to an external terminal PWM1 of the switching control circuit IC3. The external terminal PWM1 is a terminal for inputting a signal of 0 or 1 for the lighting control of the LED. The external terminal PWM1 constitutes a second external terminal.

The other end of the pull-up resistor $R_{p1}$ is connected to an external terminal REG2 of the switching control circuit IC3. The external terminal REG2 is a terminal for outputting voltage to an outside of the switching control circuit IC3. The external terminal REG2 constitutes a first external terminal.

One end of the pull-up resistor $R_{p2}$ is connected to an external terminal PWM2 of the switching control circuit IC3. The other end of the pull-up resistor $R_{p2}$ is connected to the external terminal REG2 of the switching control circuit IC3. The external terminal PWM2 is a terminal for inputting a signal of 0 or 1 for the lighting control of the LED. The external terminal PWM2 constitutes the second external terminal.

The switching control circuit IC3 includes a drive-signal generating unit 40, a function setting circuit 41, constant current sources 42 and 43 as a current supply circuit, a REG voltage output controller 44, a transistor Tr2, comparators CP4 and CP5, and switches SW4, SW5, and SW6.

A collector of the transistor Tr2 is connected to an external terminal IN2 of the switching control circuit IC3. The external terminal IN2 is a terminal for inputting input voltage from a commercial power supply or the like. An emitter of the transistor Tr2 is connected to the external terminal REG2 through the switch SW6. The switch SW6 has one common contact point and two contact points. The common contact point of the switch SW6 is connected to the external terminal REG2. One of the two contact points of the switch SW6 is connected to the emitter of the transistor Tr2, and the other of the two contact points of the switch SW6 is connected to the ground. The switch SW6 is controlled by a signal from the function setting circuit 41, thereby switching between a state where the external terminal REG 2 is connected with the emitter of the transistor Tr2 and a state where the external terminal REG 2 is connected with the ground.

When the level of the voltage input into the external terminals IN2 is a threshold or less, the REG voltage output controller 44 turns off the transistor Tr2 and performs control such that voltage is not output from the external terminal REG2. When the level of the voltage input into the external terminal IN2 is more than the threshold, the REG voltage output controller 44 turns on the transistor Tr2 and performs control such that the REG voltage is output from the external terminal REG2.

The drive-signal generating unit 40 generates a drive signal for driving a switching element such as a power MOSFET for dimming that is connected to the LED to constitute an LED backlight, based on signal and the like input from the external terminals PWM1 and PWM2 and other external terminals (not shown), and outputs the drive signal to the external terminals ST1 and ST2.

The switching element such as the above-described power MOSFET for dimming is connected to each of the external terminals ST1 and ST2.

One end of the switch SW4 is connected to a wiring connecting the external terminal PWM1 with the drive-signal generating unit 40. The other end of the switch SW4 is connected to the constant current source 42. The constant current source 42 is operated by the internal voltage input from the external terminal IN2.

One end of the switch SW5 is connected to a wiring connecting the external terminal PWM2 with the drive-signal generating unit 40. The other end of the switch SW5 is connected to the constant current source 43. The constant current source 43 is operated by the internal voltage input from the external terminal IN2.

A non-inversion input terminal of the comparator CP4 is connected to the wiring connecting the external terminal PWM1 with the drive-signal generating unit 40. A predetermined threshold voltage v4 is input into an inversion input terminal of the comparator CP4.

A non-inversion input terminal of the comparator CP5 is connected to the wiring connecting the external terminal PWM2 with the drive-signal generating unit 40. A predetermined threshold voltage v5 is input into an inversion input terminal of the comparator CP5. The threshold voltage v4 and the threshold voltage v5 may be equal to or different from each other.

The output signal of the comparator CP4 and the output signal of the comparator CP5 are input into the function setting circuit 41, respectively.

The function setting circuit 41 sets one of a plurality of functions capable of setting in the switching control circuit IC3 in response to an output signal of the comparator CP4, and sets one of a plurality of functions capable of setting in the switching control circuit IC3 in response to an output signal of the comparator CP5.

The function setting circuit 41 may set one function by combining the output signal of the comparator CP4 with the output signal of the comparator CP5. Here, the function setting means the operation of setting information or the like for determining a mode switching condition of the switching operation of the switching element, as before.

An operation of the LED backlight driver 300 configured in this way will be described.

When the input voltage is input into the external terminal IN2 and then the switching control circuit IC3 is started, the function setting circuit 41 turns on each of the switches SW4 and SW5. Further, the function setting circuit 41 controls the switch SW 6 to connect the external terminal REG2 with the ground.

As a result, a current flows from the constant current source 42 through the external terminal PWM1 to the pull-up resistor $R_{p1}$, and a current flows from the constant current source 43 through the external terminal PWM2 to the pull-up resistor $R_{p2}$.

At this time, the electric potential of the external terminal REG2 is controlled to a ground level. Thus, when the electric potential of the external terminal PWM1 increases by the supplying of the current from the constant current source 42 and then the electric potential reaches the threshold voltage v4, the output value of the comparator CP4 becomes a high level. Likewise, when the electric potential of the external terminal PWM2 increases by the supplying of the current from the constant current source 43 and then the electric potential reaches the threshold voltage v5, the output value of the comparator CP5 becomes a high level.

When the high level of signal is transmitted from the comparator CP4 to the function setting circuit 41, the function setting circuit performs a function setting of the switching control circuit IC3 in response to this signal. Likewise, when the high level of signal is transmitted from the comparator CP5 to the function setting circuit 41, the function setting circuit 41 performs another function setting of the switching control circuit IC3 in response to this signal.

When the function setting is finished, the function setting circuit 41 turns off the switches SW4 and SW5. Further, the function setting circuit 41 controls the switch SW 6 to connect the external terminal REG2 with the emitter of the transistor Tr2.

Subsequently, the normal operation of performing the ON-OFF control of the switching element is started by the drive-signal generating unit 40. *

As described above, in the switching control circuit IC3, the external terminals PWM1 and PWM2, which is used for generating the drive signal of the switching element, and the external terminal REG2, which is used for outputting voltage to the outside, are also used as a terminal for the function setting. The switching control circuit IC3 performs the function setting using the pull-up resistors $R_{p1}$ and $R_{p2}$ that are the passive element essential for the backlight driver. Therefore, the miniaturization and the reduction in cost of the LED backlight driver 300 are achieved without the dedicated element for the function setting in the LED backlight driver 300.

Each of the above-described function setting circuits 11a, 24 and 41 performs the function setting using the first external terminal that becomes the ground level during the start of the switching control circuit, and the second external terminal that is connected to the first external terminal through the passive element.

However, the first external terminal used for the function setting may not be the terminal having the period to be the ground level. A terminal having a period in which the electric potential is fixed to a predetermined value may be used as the first external terminal. The first and second external terminals necessarily use terminals other than the terminal connected to the ground.

In a case the first external terminal is not controlled to the ground level, the function setting may be performed by further forming a circuit for detecting a potential difference between both ends of the passive element connected between the first and second external terminals.

Fourth Embodiment

Figure 5:
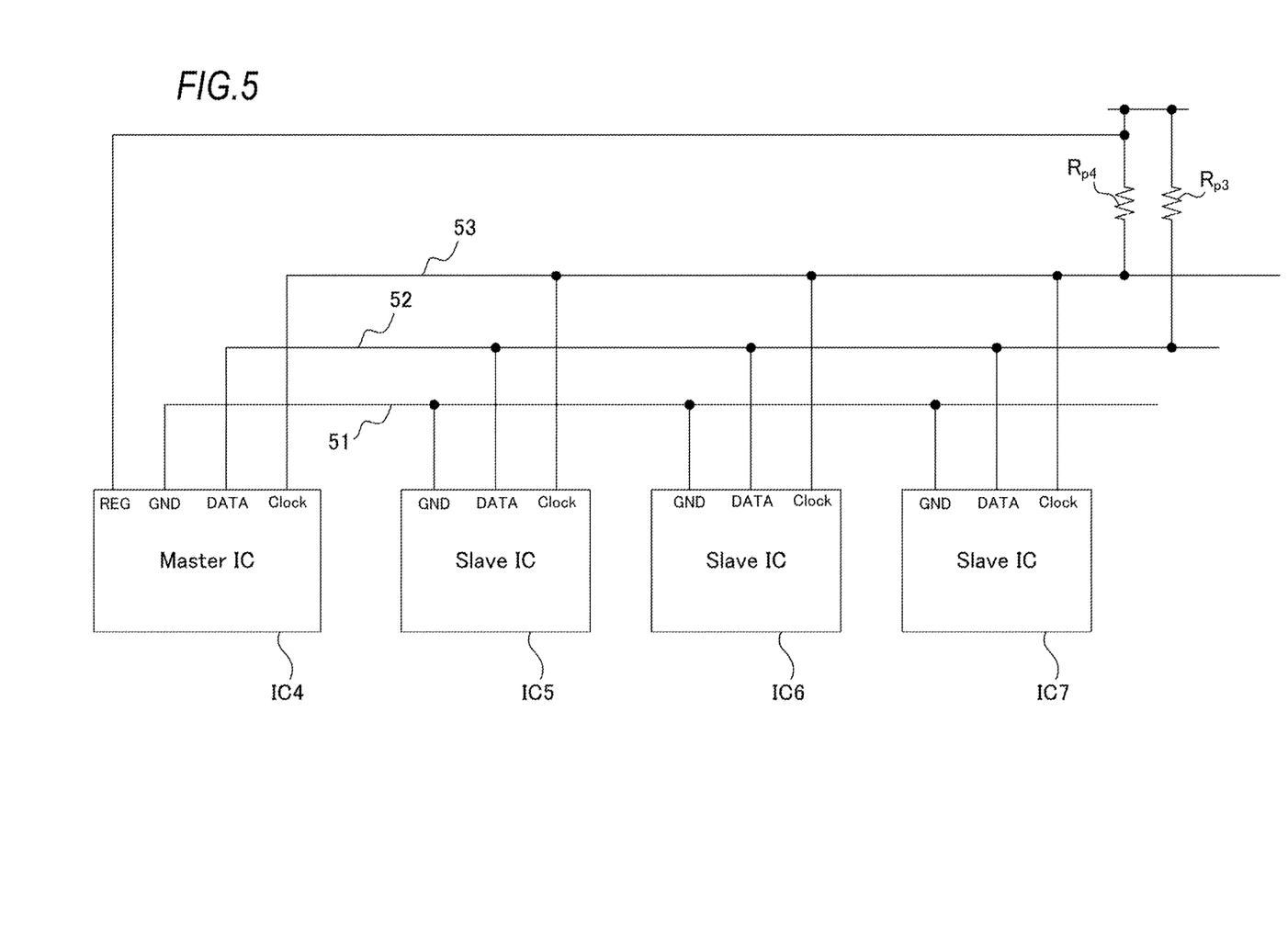
FIG. 5 is a view illustrating a schematic configuration of a power supply system having a plurality of switching control circuits.

FIG. 5 is a view illustrating a schematic configuration of a power supply system having a plurality of switching control circuits.

The power supply system illustrated in FIG. 5 includes switching control circuits IC4 to IC7, a ground wiring 51, a data signal line 52, a clock signal line 53, and pull-up resistors $R_{p3}$ and $R_{p4}$.

Each of the switching control circuits IC4 to IC7 may be a circuit used for the current-resonance-type switching power-supply device of FIG. 1, a circuit used for the DC/DC converter of FIG. 3, a circuit used for the LED backlight driver of FIG. 4 or the like.

The switching control circuit IC4 is set as a master unit of the power supply system and includes an external terminal REG, an external terminal GND, an external terminal DATA, and an external terminal Clock.

Each of the switching control circuits IC5 to IC7 is set as a slave unit of the power supply system and includes an external terminal GND, an external terminal DATA, and an external terminal Clock.

The external terminal REG is a terminal for outputting internally generated voltage to the outside.

The external terminal GND is a terminal connected to a ground.

Each of the external terminal DATA and the external terminal Clock is a terminal communicating with another switching control circuit.

The respective external terminals GND of the switching control circuits IC4 to IC7 are connected to each other by the ground wiring 51.

The respective external terminals DATA of the switching control circuits IC4 to IC7 are connected to each other by the data signal line 52. The pull-up resistor $R_{p3}$ is connected to the data signal line 52.

The respective external terminals Clock of the switching control circuits IC4 to IC7 are connected to each other by the clock signal line 53. One end of the pull-up resistor $R_{p4}$ is connected to the clock signal line 53. The external terminal REG of the switching control circuit IC4 is connected to the other end of the pull-up resistor $R_{p4}$.

The external terminal REG of the switching control circuit IC4 is in the ground level at a time of the start of the switching control circuit IC4. Therefore, the switching control circuit IC4 introduces a current from the external terminal Clock to the pull-up resistor $R_{p4}$ at a time of the start, and detecting a potential difference between the external terminal REG and the external terminal Clock. The switching control circuit IC4 can perform the function setting based on the detected potential difference.

In this power supply system, the external terminal REG of the switching control circuit IC4 constitutes the first external terminal, the external terminal Clock of the switching control circuit IC4 constitutes the second external terminal, and the pull-up resistor $R_{p4}$ constitutes the passive element.

Incidentally, the external terminal REG may be connected to an opposite end to a side connecting with the data signal line 52 of the pull-up resistor $R_{p3}$ and the external terminal DATA may function as a second external terminal.

Although the specific embodiments of the present invention have been disclosed above, the invention is not limited to the above-mentioned embodiments but can be modified in various forms without departing from the gist thereof.

For example, as the passive element for performing the function setting, the resistor or the capacitor has been used herein, but a diode may also be used. Further, the function setting may be performed using a plurality of passive elements selected from the resistor, the capacitor and the diode.

As described above, the following aspects have been disclosed herein.

A disclosed switching control circuit is a switching control circuit for performing an ON-OFF control of a switching element. The switching control circuit includes a first external terminal, a electric potential on which is controlled; a second external terminal, a electric potential on which is controlled; a passive element, which is connected between the first external terminal and the second external terminal; and a function setting circuit, which performs a function setting based on a constant of the passive element.

The disclosed switching control circuit further includes a current supply circuit, which supplies an electric current from the second external terminal to the passive element in a period when the electric potential of the first external terminal is fixed. The function setting circuit performs a function setting based on a potential difference between the first external terminal and the second external terminal in a state where the electric current is supplied from the current supply circuit.

In the disclosed switching control circuit, a electric potential of the first external terminal is controlled to be a ground level in a period, and the current supply circuit supplies the electric current from the second external terminal to the passive element in a period when the electric potential of the first external terminal is in the ground level.

In the disclosed switching control circuit, the electric potential of the first external terminal is controlled to be the ground level during start of the switching control circuit.

In the disclosed switching control circuit, a electric potential of the first external terminal is controlled to be a ground level in a period.

In the disclosed switching control circuit, the electric potential of the first external terminal is controlled to be the ground level during start of the switching control circuit.

In the disclosed switching control circuit, a plurality of pairs of external terminals is provided, and wherein the function setting circuit performs one or more function settings based on a constant of a plurality of passive elements that are respectively connected to the plurality of pairs.

In the disclosed switching control circuit, the passive element comprises at least one of a resistor, a capacitor or a diode.

A disclosed switching power-supply device is a switching power-supply device for generating a second voltage from a first voltage by a switching operation of a switching element, the switching power-supply device includes a above-described switching control circuit; and a switching element, which is ON-OFF controlled by the switching control circuit.

What is claimed is:

1. A switching control circuit for performing an ON-OFF control of a switching element, comprising:
    a first external terminal, wherein an electric potential at the first external terminal is controlled;
    a second external terminal, wherein an electric potential at the second external terminal is controlled;
    a passive element connected between the first external terminal and the second external terminal;
    a current supply circuit configured to supply an electric current, via the second external terminal, to the passive element in a period when the electric potential of the first external terminal is fixed at a particular level; and
    a function setting circuit, which performs a function setting based on a constant of the passive element.

2. The switching control circuit according to claim 1,
    wherein the function setting circuit performs a function setting based on a potential difference between the first external terminal and the second external terminal in a state where the electric current is supplied from the current supply circuit.

3. The switching control circuit according to claim 2,
    wherein the electric potential of the first external terminal is controlled to be ground potential in the period, and
    wherein the current supply circuit supplies the electric current, via the second external terminal, to the passive element in the period.

4. The switching control circuit according to claim 3,
    wherein the electric potential of the first external terminal is controlled to be the ground potential when starting the switching control circuit.

5. The switching control circuit according to claim 1,
    wherein the electric potential of the first external terminal is controlled to be ground potential in a period.

6. The switching control circuit according to claim 5,
    wherein the electric potential of the first external terminal is controlled to be the ground potential when starting the switching control circuit.

7. The switching control circuit according to claim 1, further comprising:
    a plurality of pairs of external terminals,
    wherein the function setting circuit performs one or more function settings based on constants of a plurality of passive elements that are respectively connected to the plurality of pairs.

8. The switching control circuit according to claim 1, wherein the passive element comprises at least one of a resistor, a capacitor or a diode.

9. A switching power-supply device comprising:
    a switching control circuit comprising:
        a first external terminal, wherein an electric potential at the first external terminal is controlled;
        a second external terminal, wherein an electric potential at the second external terminal is controlled;
        a passive element connected between the first external terminal and the second external terminal;
        a current supply circuit configured to supply an electric current, via the second external terminal, to the passive element in a period when the electric potential of the first external terminal is fixed at a particular level; and
        a function setting circuit, which performs a function setting based on a constant of the passive element;
    a switching element, which is ON-OFF controlled by the switching control circuit; and
    wherein a second voltage is generated from a first voltage by a switching operation of the switching element.

10. A switching control circuit comprising:
    a first external terminal, wherein an electric potential at the first external terminal is controlled;
    a second external terminal, wherein an electric potential at the second external terminal is controlled;
    a passive element connected between the first external terminal and the second external terminal;
    a function setting circuit, which performs a function setting based on a constant of the passive element; and a transistor configured to control, based on the constant of the passive element, a function setting other than the function setting of the function setting circuit.

11. The switching control circuit according to claim 10, further comprising a switching element connected to the first external terminal to control the electric potential at the first external terminal.

12. The switching control circuit according to claim 11, wherein the switching element is configured to change the electric potential at the first external terminal after performing the function setting of the function setting circuit.

13. The switching control circuit according to claim 12, wherein the transistor is configured to control the function setting other than the function setting of the function setting circuit after the electric potential at the first external terminal is changed by the switching element.

14. The switching control circuit according to claim 10, further comprising a power factor correction controller connected to the transistor.

* * * * *